US009948989B1

(12) United States Patent
Hannum et al.

(10) Patent No.: US 9,948,989 B1
(45) Date of Patent: Apr. 17, 2018

(54) INTERACTIVE MEDIA CONTENT LISTING SEARCH AND FILTERING SYSTEM FOR A MEDIA CONTENT LISTING DISPLAY SYSTEM SUCH AS AN ELECTRONIC PROGRAMMING GUIDE

(75) Inventors: Sandi Hannum, Philadelphia, PA (US); Peter Sheedy, Huntington Valley, PA (US); James R. Albrecht, Girdwood, AK (US); Terri L. Swartz, Marlborough, MA (US); Bruce R. Bradley, Wayne, PA (US); Matt Wong, Palo Alto, CA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 943 days.

(21) Appl. No.: 11/186,171

(22) Filed: Jul. 21, 2005

Related U.S. Application Data

(60) Provisional application No. 60/590,055, filed on Jul. 21, 2004.

(51) Int. Cl.
| | |
|---|---|
| *G06F 3/00* | (2006.01) |
| *G06F 13/00* | (2006.01) |
| *H04N 5/445* | (2011.01) |
| *H04N 21/482* | (2011.01) |
| *H04N 21/45* | (2011.01) |
| *H04N 21/4722* | (2011.01) |
| *H04N 21/466* | (2011.01) |
| *H04N 21/454* | (2011.01) |
| *H04N 21/475* | (2011.01) |

(52) U.S. Cl.
CPC ........ *H04N 21/482* (2013.01); *H04N 21/454* (2013.01); *H04N 21/4532* (2013.01); *H04N 21/466* (2013.01); *H04N 21/4668* (2013.01); *H04N 21/4722* (2013.01); *H04N 21/4755* (2013.01); *H04N 21/4828* (2013.01)

(58) Field of Classification Search
USPC .................................................. 725/39, 53
See application file for complete search history.

(56) References Cited

U.S. PATENT DOCUMENTS

| | | | |
|---|---|---|---|
| 5,694,176 A | | 12/1997 | Bruette et al. |
| 6,005,565 A | * | 12/1999 | Legall et al. .................. 715/721 |
| 6,216,264 B1 | * | 4/2001 | Maze ................. H04N 5/44543 345/589 |
| 6,742,184 B1 | * | 5/2004 | Finseth et al. .................. 725/52 |
| 6,817,027 B1 | | 11/2004 | Curreri |

(Continued)

*Primary Examiner* — Kunal Langhnoja
(74) *Attorney, Agent, or Firm* — Merchant & Gould P.C.

(57) ABSTRACT

An interactive media content listing search system is herein disclosed which provides for enhanced interactive access of media content listings contained within an media content display system. Enhanced searching for available media contents is enabled by a plurality of user configurable attributes, which defines characteristics of media content that may be similar to the user's tastes. The plurality of user configurable attributes may be logically combined during the search operation using "AND" and/or "OR" boolean operators. Additionally, means are provided to allow recursive searches of available media content listings in an easy manner such that the results may be more finely tailored to suit the user's tastes. Following the search operation, the user may save the search attributes to a file that is stored within the system for use at a later time.

17 Claims, 10 Drawing Sheets

(56) References Cited

U.S. PATENT DOCUMENTS

| | | | | |
|---|---|---|---|---|
| 6,865,746 B1* | 3/2005 | Herrington | ........ | H04N 5/44543 |
| | | | | 348/E5.105 |
| 7,673,315 B1* | 3/2010 | Wong | ................. | H04N 5/44543 |
| | | | | 386/254 |
| 8,051,450 B2* | 11/2011 | Robarts | .............. | H04N 5/44543 |
| | | | | 386/296 |
| 2006/0095937 A1* | 5/2006 | Knudson | ............... | G06F 3/0482 |
| | | | | 725/45 |

* cited by examiner

INTERACTIVE MEDIA CONTENT LISTING SEARCH AND FILTERING SYSTEM FOR A MEDIA CONTENT LISTING DISPLAY SYSTEM SUCH AS AN ELECTRONIC PROGRAMMING GUIDE

CROSS-REFERENCE TO RELATED APPLICATIONS

This application claims priority under 35 U.S.C. 119(e) on U.S. Provisional application No. 60/590,055 Entitled "VIDEO PLAYLIST AND CUSTOMIZED EPG", filed on Jul. 21, 2004, by James R. Albrecht, et al.

FIELD OF THE INVENTION

This invention relates generally to interactive electronic program guides, and more particularly, to a system which provides for enhanced searching and filtering capabilities of media content listings which are displayed in a media content display system such as an electronic program guide, wherein user defined search attributes may be utilized in order to tailor the searching and filtering for selective access of media content across disparate network platforms, and wherein the search attributes are savable to a file for usage at a later time.

BACKGROUND OF THE INVENTION

Television programming was originally supplied to the consumer through a relatively small number of broadcast sources via an aerial transmission medium. Using this medium, each programming source was allocated a specified frequency distribution within a particular localized demographic region. Each of these frequency distributions were mapped to a particular channel on the television receiver in order to facilitate ease of use by the consumer. Due to consumer demand however, the number of programming sources has grown beyond the capacity of allocatable bandwidth within any localized area. In addition to this fact, the consumer has also desired access to national programming content that would not have been readily available in the older, legacy aerial transmission systems. In order to remedy these problems, cable television distribution systems were implemented, which generally included a lattice of coax or fiber based transmission lines such as hybrid-fiber-cable (HFC), for transmission of the large amount of television programming. Thus, today's video entertainment distribution or Cable Access television (CATV) systems have the capacity to convey a plethora of video programs from well over a hundred varying programming sources simultaneously.

Today's television programming provided by each programming source typically includes a plurality of varying types of media content such as video programs that are scheduled during prespecified time-slots during the day. In the past, the relatively few number of programming sources was facilitated by a printed schedule of upcoming programming. However, the relatively large number of programming sources available in today's cable television distribution systems have rendered the use of printed video programming essentially untenable. In addition to video programs from programming sources, other media content such as video on demand (VOD), has become readily available to a user thus further enlarging the quantity of programs that may be viewed. In order to provide viewer notification for all of the media content available, various media content listing systems have been developed. One popular type of media content listing system is an electronic programming guide (EPG).

The conventional EPG generally comprises a grid-like display having a plurality of rows depicting the programming schedules for a corresponding plurality of programming sources. Each row may have a multiple of cells of varying length, which are each vertically aligned according to their respective time-slots, wherein each cell may contain a listing of an associated video program that is transmitted during a particular time-slot. The EPG may be scrollable in order to view all of the available programming sources from the cable television distribution system. The rows comprising the EPG may scroll upwards, or downwards automatically such that a user may view offered video programs from all of the programming sources without the need for intervention therefrom. The EPG may also be adapted to scroll manually such that users may sequentially view program offerings at their own pace. In addition to the ability of scrolling up or down, the user may also scroll the displayed EPG right or left in order to view future or yet-to-be-aired programming. Interactive use of the EPG screen is preferably accomplished by presenting a cell that is highlighted for indication to the user that further action may be taken thereon such as a request to play the particular video program shown in said cell. The cell may be iteratively moved upward, downward, left, or right within the EPG screen by pressing the "up", "down", "left", or "right" keys respectively on a conventional remote control device. When a video program is found that is suitable for view by the user, an "OK" or other similar button may be pressed in order to erase the EPG screen from the display and initiate play of the selected video program.

Due to the currently rather large number of programming sources available with most cable television distribution systems, the ability to find an interesting program to watch has become a burdensome affair. At any given time during the day, the user must sequentially read through all of the listings in order to find a program that most closely suits the user's tastes. Even for a user that is quite acquainted with the use of the EPG, reading the listings from over a hundred programming sources may require an immense effort. U.S. Pat. No. 6,865,746 to Herrington has solved this problem somewhat by providing a search mechanism that programmatically finds video programs that are generally equivalent to a known video program. Nevertheless, this system suffers in that a video program suitable to the user's tastes must be previously known and accessible to the system. That is, an automated search for an interesting program may not be conducted if another program that is similar to the user's tastes is not available. It may be important to note that a user's tastes may fluctuate from time-to-time, whereby the user may desire a hard-hitting video program during the day and alternatively desire a relatively slower-moving video program during the twilight hours. Thus prior to an effective search using the '746 system, the user must have access to a video program listing that is similar to the one that is desired. Another key drawback of the '746 system is that search results are only placed into a list; the search results may not be superimposed upon the commonly used and well administered EPG screen. Thus, the user of the '746 system looses the look-and-feel provided by the conventional EPG screen, of which he/she may have become well acquainted through the frequent use thereof. An additional drawback of the '746 system is that means are only provided for searching within a CATV network; that is, no means are provided to access media content from other disparate network platforms such as Internet content, media content stored on a Personal Video Recorder (PVR) device, Peer-2-Peer (P2P) devices, or even files stored on a personal computer.

Thus, there has remained a long-felt, unsatisfied need for a media content search and filtering system for a media content display system such as an electronic programming guide that enables the ability to perform searches for interesting programs thereon without having the necessity of prior access to a video program listing that is similar thereto, wherein the media content that is searchable or filterable by the system possesses the ability to search or filter media content that is available across disparate network platforms.

SUMMARY OF THE INVENTION AND OBJECTIVES

It is accordingly an object of the present invention to provide a media content search and filtering system for a media content listing display system such as an electronic programming guide which enables a tailored search for media content emanating from a plurality of disparate network platforms.

Another object of the present invention is to provide a media content search and filtering system for a media content search and filtering system for a media content display system such as an electronic programming guide which enables a tailored search for video programming using a plurality of input criteria.

Another object of the present invention is to provide a media content search and filtering system for a media content listing display system such as an electronic programming guide, wherein the results obtained from the search and filtering system are superimposed on a conventional electronic programming guide.

Another object of the present invention is to provide a media content search and filtering system for a media content listing display system such as an electronic programming guide, wherein access and operation of the search system is enabled by consumer electronic display devices having interactive capabilities.

Another object of the present invention is to provide a media content search and filtering system for a media content listing display system such as an electronic programming guide, wherein interaction by the user for the use thereof, is provided in an ergonomically intuitive manner.

Another object of the present invention is to provide a media content search and filtering system for a media content listing display system such as an electronic programming guide, wherein input criterion by the user may be saved for use at a later time.

These objects as well as other objects are met in a a media content search and filtering system for a media content listing display system such as an electronic programming guide that is capable of searching through the media content listings which may be existent within media content display systems such as an EPG, or Video On Demand (VOD) media content display systems. Additionally, the system of the present invention may provide search capabilities for media content existent on other disparate platforms such as the Internet, Peer-2-Peer (P2P) devices, Personal Video Recorders (PVRs), or even files stored in a common personal computer. The search or filtering operation is preferably performed on a plurality of searching criteria that may be executed simultaneously using the common AND/OR boolean operators. This search criteria may be interactively entered by the user prior to the search operation via a configuration screen that provides an intuitive interface and requires a minimal amount of keystrokes. Following execution of the search operation, the results of each search are superimposed upon the EPG for easy viewing by the user. Alternatively, the CATV distribution system may be adapted to automatically filter media content in an EPG which is periodically forwarded to each subscriber on its respective network.

The interactive search system of the present invention utilizes information contained within the television program listings data or metadata that is commonly associated with each media content item. For example, the television program listings data may contain generic parameters of an associated video program including title, actors, ratings, genres, program type, or the like. The program type may include other pertinent information regarding the display format, or other features available with the particular video program asset such as standard definition, high definition, aspect ratio of the visual display, closed caption availability, and the like. Nevertheless, it is contemplated that virtually any media content associated parameter that is available to the system may be used to provide detailed searches of available programming for the user.

One aspect of the present invention is a media content search and filtering system for a media content display system that presents search results in a easily viewable manner. The media content that are found during the search may preferably be superimposed upon its native display system in several differing modes. For example, in a first and preferred mode, cells of the media content listings display system such as an EPG having video program listings that are positively selected by the searching operation are shown having an easily identified delineating indicia then those cells that were not positively selected. The delineating indicia may be any visual identifying means that allows the user to quickly identify, on the display, those cells which were positively selected as opposed to those cells which were not positively selected. Examples of such delineating indicia may be cells having a differing color, cells having a differing brightness, cells having embedded text that were not positively selected being erased from view, text within the cells having differing styles such as bold, or italics lettering, or the like.

Thus, the first mode allows identification of positively selected media content listings that are easily ascertained by the user via perusal of the resulting media content display system following the search operation. Preferably, non-positively selected listings are not completely erased from the screen in order to be at least partially viewable for possible identification and viewing thereof by the user. Nevertheless, it is to be understood that non-positively selected media content listings may be totally erased from view if such functionality is needed or desired. Identification of non-positively selected listings may also enable further tailoring of the search criteria, wherein the user may modify the criteria and then perform the search operation a second time in order to obtain more exacting results.

Another second alternative media content display system resulting display mode is presented whereby rows within an EPG screen, representative of a single programming source, in which no media content listings were positively selected, are removed from the resulting EPG screen. Conversely, the EPG which has an entire column of non-positively selected media content listings may be removed from the resulting display screen. The search or filtering results shown on the resulting media content display screen may be effectively compressed into an easily navigatable display for the user.

Thus ease of use is further enhanced by not requiring the perusal of rows from which no video program listings were selected.

Optionally, the first and second display modes may incorporate a highlighted cell movement function that allows quick movement to a cell having a positively selected media content item therein. Using the highlighted cell movement function provided by a conventional media content display system such as an EPG, the movement function may be adapted to 'jump' across unselected rows or columns such that fewer numbers of input key presses or iterations are required by the user in order to find a particular interesting program from among the positively selected list of media content listings.

Another aspect of the present invention is disclosed whereby a consumer electronics display device other than a display such as a television and associated remote control device may be used to operate the search system and view the results obtained thereby. A commonly owned, and copending application entitled "User Modifiable Media Content For Interactive Access of Media Content Across Disparate Network Platforms", which discloses means to provide interactivity of the consumer electronics display device to the cable television distribution systems is hereby incorporated by reference in its entirety. The consumer electronics display device may be any device possessing interactive capabilities, which are defined as any networked device having an input means such a keyboard or keypad for the input of a user request and an associated display for prompting response therefrom. Thus consumer electronics display devices having interactive capabilities may include cellular telephones, Internet enabled telephones, personal computers, personal digital assistants (PDAs), laptop computers, portable media devices, smart watches, and gaming stations. Either of these devices, when connected to a suitable network, may be utilized to access or operate the media content search and filtering system of the present invention. One particular scenario is envisioned whereby access or operation of the search system may be provided to a user when away from home; the user may use the search and filtering system to check for available media content as well as view the available media content from the display portion of the consumer electronic display device.

Another aspect of the present invention is a search and filtering system for a media content display system such as an EPG, whereby search criteria may be saved and recalled at a later time. This feature serves to further minimize the keystrokes and time that a user must spend in coordinating each search operation. Once a user has entered pertinent criteria from which a search may be conducted, these criteria may be saved for another search at some time in the future. This is particularly important due to the fact that ongoing programming content from all of the programming sources is inherently in constant change such that search results obtained at two differing times may yield entirely differing results.

Another aspect of the present invention is a media content search and filtering system which provides for manual search operations of available content as well as automated filtering of media content that is forwarded to the user premises equipment. Manual search operations are provided whereby a search for particular types of media content may be performed at any time in response to a user request. This manual search operation provides advantage in that precise control may be obtained for searching operations that yield results that may be suitable to the user's tastes at any one particular time. Conversely, automated filtering of media content may also be provided whereby media content display system may be adapted to automatically filter incoming media content when populating entries within its respective media content display system such as an EPG and/or its associated VOD display. Thus when a user may accesses the EPG screen in the normal manner, the resulting EPG screen displays results which have been previously filtered by the system.

BRIEF DESCRIPTION OF THE DRAWINGS

For a further understanding of the nature and objectives of the present invention, reference should be made to the following detailed description, taken in conjunction with the accompanying drawings, in which like elements are given the same or analogous reference numbers wherein.

DETAILED DESCRIPTION OF THE PREFERRED EMBODIMENTS

Figure 1:
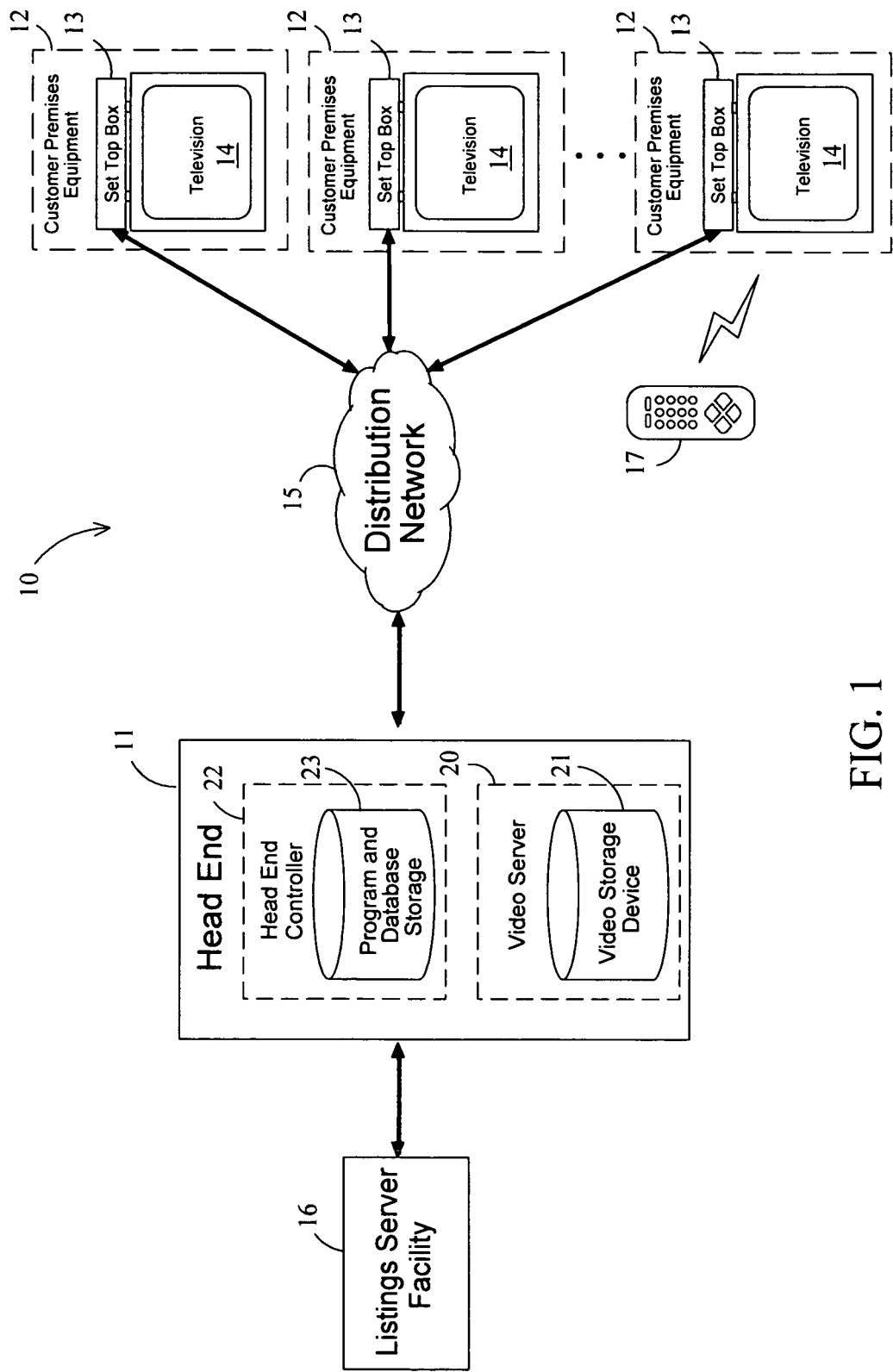
FIG. 1 is a block diagram of some of the principle components of the video distribution system of the present invention.

A diagrammatic view of a cable television distribution system 10 incorporating a media content search and filtering system for a media content listing display system such as an electronic program guide (EPG) is shown in FIG. 1. The distribution system generally comprises a head end 11 which processes broadcast video programs and other programming services emanating from a plurality of programming sources and forwards these video programs onward to a set top box (STB). The STB 13 exists as a portion of a customer premises equipment 12, wherein the customer premises equipment also includes a display 14 such a conventional television that enables view of the video programs by a user. Each STB 13 is operable to control which programs are shown on their associated display 14 and outputs commonly used NTSC, PAL, or SECAM formatted signals thereto. The distribution network 15 is typically comprised of a lattice of coaxial cable lines or hybrid-fiber-cable (HFC) for connectivity of the head end to the plurality of STBs in the network, and may also include a plurality of broadcast centers or nodes that each service a subset of STBs within a small demographic area. A Listings server facility 16 is shown which compiles scheduled video program listings for each programming source (not shown) for transmission to the head end 11. Although the head end may obtain scheduled video program listings from one or several listings server facilities, only one is shown in the drawings for clarity.

The head end 11 of the distribution system may include a video server 20, which is capable of storing a plurality of video programs for view at a user specified time. The server 20 is operable to process multiple incoming requests from a plurality of users at the same time, and delegates the necessary bandwidth for a requested stored video program for transmission to the user, wherein such a service that is provided to the user is commonly referred to as Video-On-Demand (VOD). In order to facilitate storage requirements for such a system, a video storage device 21 is included therein, which may consists of one or an array of magnetic or optical disks, or servers based on RAM technology. Additionally, a head end controller 22 is also included that preferably contains at least one microprocessor for controlling access to content stored in the video server 20. The head end controller also has an associated program and database storage 23, which houses user information, stored executable programs, or other fields of information that are used by the distribution system.

Figure 2:
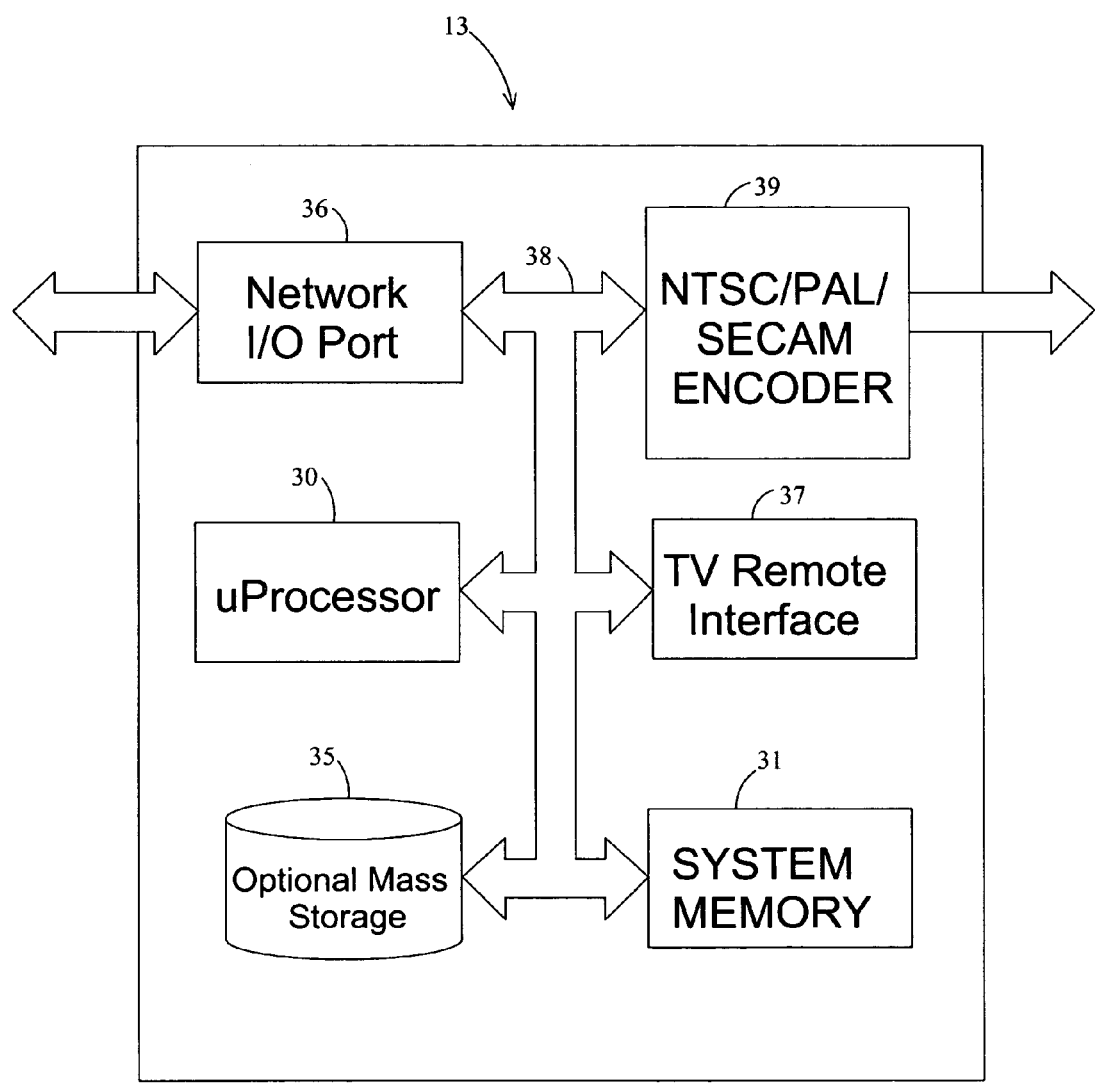
FIG. 2 is a block diagram of the set top box of the present invention.

FIG. 2 shows a generic diagrammatic view of a the STB 13 which may form a component of the customer premises equipment. The STB generally comprises a programmable microprocessor 30, non-volatile Read Only Memory (ROM) and volatile Random Access Memory (RAM) comprising the system memory 31, optional mass storage 35, a suitable distribution network network I/O port 36, and remote control device interface circuit 37, which are all interconnected together via multi-conductor bus 38. The network I/O port 36 decodes streaming video data from the head end 11 and forwards this data to the NTSC/PAL/SECAM encoder 39. The ROM contains executable programming instructions that are perennially persistent and serve to bootstrap the STB directly after initial power on. The RAM contains volatile memory which may be populated with various executable instructions that are served from a conventional carousel (not shown) resident within the head end 11. An optional mass storage device 35 is also included for the non-volatile storage of user modifiable data within the STB 13. The mass storage device 35 may be comprised of a magnetic or optical disk, electrically erasable programmable read only memory (EEPROM), battery backed-up RAM, or any other similar mechanism that enables the non-volatile storage of microprocessor readable data, wherein the data stored in said mass storage device 35 is easily modified by the micro-processor 30 during use. The aforedescribed STB may exist as a dedicated unit or box that is adapted for placement proximate a conventional display or form an integral part of a display such that the components (30, 31, 35, 36, 37, 38, and 39) exist within the enclosure of the display 14. Additionally, it is contemplated that the components (30, 31, 35, 36, 37, 38, and 39) may also form an integral part of other user premises equipment such as a Personal Video Recorder (PVR), personal computer, or other similar type user premises device.

The network I/O port 36 may also be responsive to processor 30 in order to request and receive data from other devices that are connected to the Internet, and telephony devices supportive of the text messaging feature over the public switched telephone network (PSTN), wherein this internetworking feature of the present invention may be accomplished by any known means. One exemplary method of providing access of the STB to other networks is via a distribution network comprising a predetermined packetized protocol such as one version of the Data Over Cable Service Interface Specification (DOCSIS). The DOCSIS protocol provides enhanced support for CATV transports (video transmission), Internet connectivity, as well as connection to the PSTN. Transmission of video programming may be accomplished by encapsulating a version of motion picture experts group (MPEG) packets within an Internet protocol (IP) frame via a service provider gateway, wherein the MPEG type packetized architecture is a form of digitized video compression protocol suitable for the transmission of video programming data. Connectivity of the STB to the Internet is provided by the routing of compatible TCP/IP or UDP/IP packets using the IP protocol. Thus, the STB is enabled to issue requests directly to any Internet coupled device or server on the Internet. Messaging over the PSTN network is also enabled from the STB by the DOCSIS compatible network.

The interactive search and filtering system of the present invention may be enabled on video distribution systems 10 having 1-way or 2-way capabilities. A 1-way video distribution system is defined as a system that provides only downstream signaling; that is, the STB 13 is not adapted to transmit control signals or any other related signals to the head end 11. If the search system is implemented on a 1-way distribution system, the search system may be implemented as a set of micro-processor compatible instructions that are stored in the mass storage 35 and are executed by the microprocessor 30 in order to perform the necessary functions provided thereby. Thus, the search system of the present invention reside entirely on the STB 13.

Alternatively, the cable television distribution system 10 may be enabled on a 2-way system that is commonly termed an interactive television (ITV) system. An interactive television (ITV) enabled network is defined as the ability of a head end to receive and process upstream requests from a distally located device such as a conventional set top box (STB) 13 in order to manipulate video data which is sent downstream to the STB corresponding to those requests. User input is typically accomplished in an ITV enabled system via a remote control device 17, which transmits individual keystroke commands via infrared, radio frequency (RF) or other suitable wireless transmission mediums to the STB. User input may also be accomplished by other user devices, which may be interconnected to the STB, such as the keyboard of a personal computer, or other similar type STB interconnected devices. In an ITV system, the search system may comprise a plurality of executable microprocessor compatible instructions that reside entirely on the program and database storage 23 and are executable by the microprocessor within the head end controller. In this mode of operation, keystroke commands from the user input are merely forwarded through the distribution network 15 for processing by the head end controller 22. Alternatively, the search system may be implemented in an ITV enabled system using a distributed processing approach or client-server model, whereby both the STB and head end controller share processing responsibilities in order perform the various functions required by the interactive search system.

Although the search and filtering system of the present invention as shown in FIG. 1 has been described using a land-based cable distribution network, however it is to be understood that the search and filtering system may also be implemented on other types of distribution systems including Digital Broadcast Satellite (DBS) systems, wherein the transmission medium is predominantly modulated radio frequency (RF) waves that are bounced off of geosynchronous air borne transponders. It is well known in the art that DBS systems offer 1-way as well as 2-way communication systems that will provide a suitable platform for the teachings of the present invention.

User interaction with the system of the present invention is preferably accomplished via the remote control device 17 for input of individual keystrokes, in conjunction with a display such as a television that provides the user with visual feedback. The present invention comprises a plurality of interactive screens, each having a plurality of actuatable buttons which may be alternatively actuated by the user. Each option button may be alternatively actuated in a conventional manner by pressing the "up", "down", "left", or "right" cursor movement buttons in order to highlight a particular option button or region and then subsequently pressing an "OK" button or other button that is adapted for requesting action of the presently highlighted cell by the user on the remote control device 17. Alternatively, specific buttons on the remote control device 17 may be provided, which are dedicated to the actuation of a particular actuatable button. Nevertheless, it is to be understood that the foregoing example is merely an exemplary configuration of a suitable user input means; other user interaction means are well known in the art and thus may be substituted accordingly without deviating from the spirit or scope of the present invention, such as a personal computer having a keyboard for user input.

The interactive search system of the present invention may be manually accessed by the user via several differing manual access points. One means of providing an access point for entry into the interactive search system may be an allocated row or channel of a conventional EPG screen. This particular manual access point provides advantage by allowing easy access by the user during the time in which searching for interesting programs is most often actively being conducted. Additionally, presence of the interactive search system is always displayed to the user whenever the EPG is being viewed in order to insure that the user maintains knowledge of its existence.

An alternative manual access point contemplates a dedicated or assigned key on the remote control device 17 which may be pressed in order to access the interactive search system. A dedicated key may be a specific key, which is disposed on the remote control device, possessing the unique functionality of accessing the interactive search system. The dedicated key preferably has representative indicia, which is disposed on the key or proximate the key, indicative of the search system such that a user may easily recognize the dedicated key from among the available keys of the remote control device. An assigned key may be any key or a predetermined sequence of keystrokes that is commonly implemented on remote control devices such as a numeric key, or a sequence of numeric keystrokes respectively. Thus, the interactive system may be adapted to interpret the predetermined key or sequence of keystrokes of the assigned key in order to provide access to the interactive search system.

Yet another alternative access point comprises interactive access provided by a consumer electronic display device having interactive capabilities. The consumer electronic display device may be any device which may be interconnected to a disparate network such as the Internet or the Public Switched Telephone Network (PSTN). An interactive consumer electronic display device is defined as any networked device having a display for prompting response from a user and an associated input means such as a keyboard or keypad for entry of responses thereto. Further a network interconnected interactive user device allows for the transmission of a message from a distal source on the network coupled with an ensuing response to the distal source. Several devices which are known to fit this criterion include Internet coupled devices such as personal computers, laptop computers, and personal digital assistants (PDAs). Similarly, cellular telephones also include means to provide interactive capabilities via the PSTN network. Thus, an access point to the interactive search system may be realized using user premises equipment typically associated with a conventional video distribution network as well as through various types of consumer electronics displays having interactive capabilities.

Figure 3:
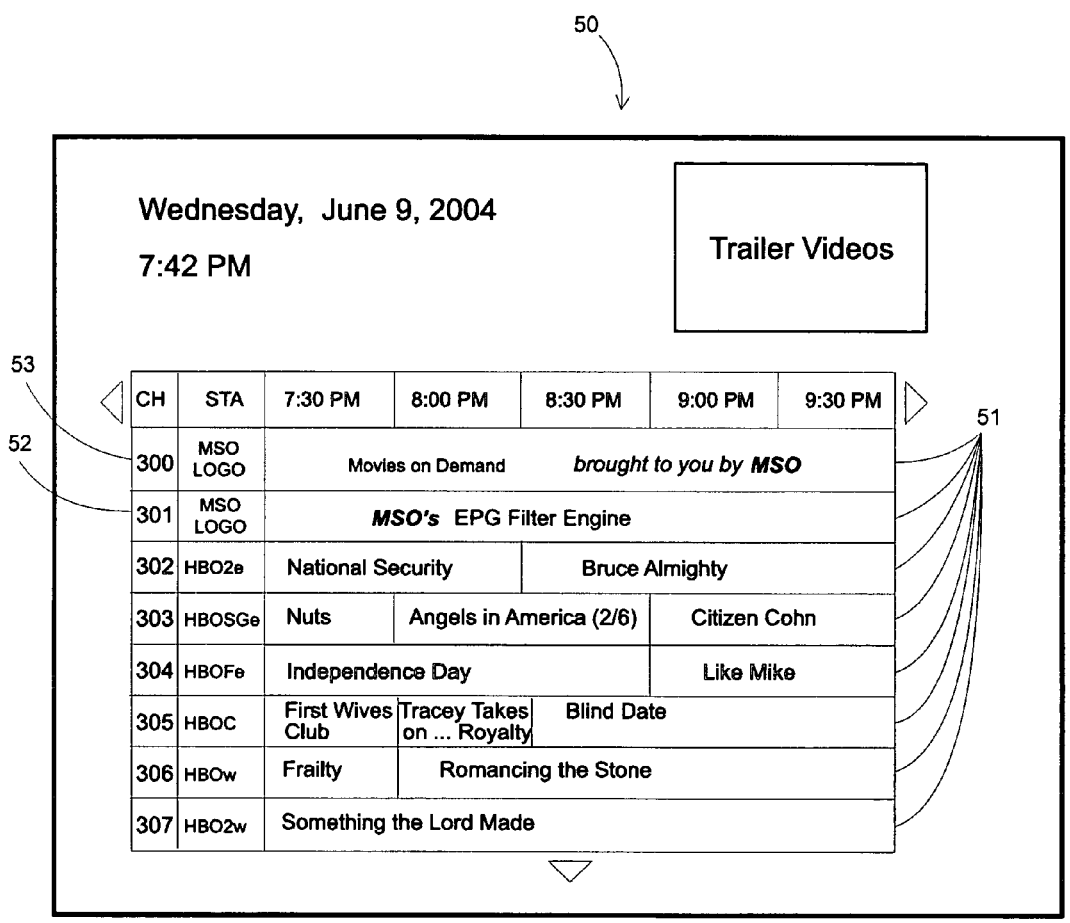
FIG. 3 is an exemplary illustration showing an EPG screen upon which a channel thereof has been allocated as a manual access point to the interactive search system.

The EPG screen 50 as shown in FIG. 3 is generated by the distribution system in a normal manner consistent with conventional EPG access techniques. The configuration and operation of the EPG is similar to known EPG implementations, but is different from conventional EPGs in that a row thereof is allocated for use as an interactive search system manual access point. The exemplary EPG screen 50 is shown having a grid-like display of eight rows 51 depicting the programming schedules for eight associated programming sources. Each row has a multiple of cells of varying length, wherein the first two cells of the left-most column contains information regarding the channel and name of the programming source respectively. Successive cells indicate individual programs that are aligned vertically according to their respective time slots. Currently aired video programs may be selected for immediate view from the EPG screen in the normal manner via movement of a highlighted cursor corresponding to a particular cell using the cursor movement buttons. Alternatively, video programs to be aired at a future time may be identified for possible view during their allocated time-slot. Thus, an access point defined by row 52 exists as a actuatable cell which may be actuated by the user during perusal of the EPG. The cell may be actuated by iteratively moving the highlighted region on the EPG screen using the "up", "down", "left", or "right" keys on the remote control device 17 and then pressing the "OK" button or other button that is adapted for requesting action of the presently highlighted cell by the user on the remote control device. The EPG interactive search system access point may be disposed on the EPG proximate a VOD access point 53 in order to group all of a MSO's interactive offerings together in a single location within the conventional EPG.

Figure 4:
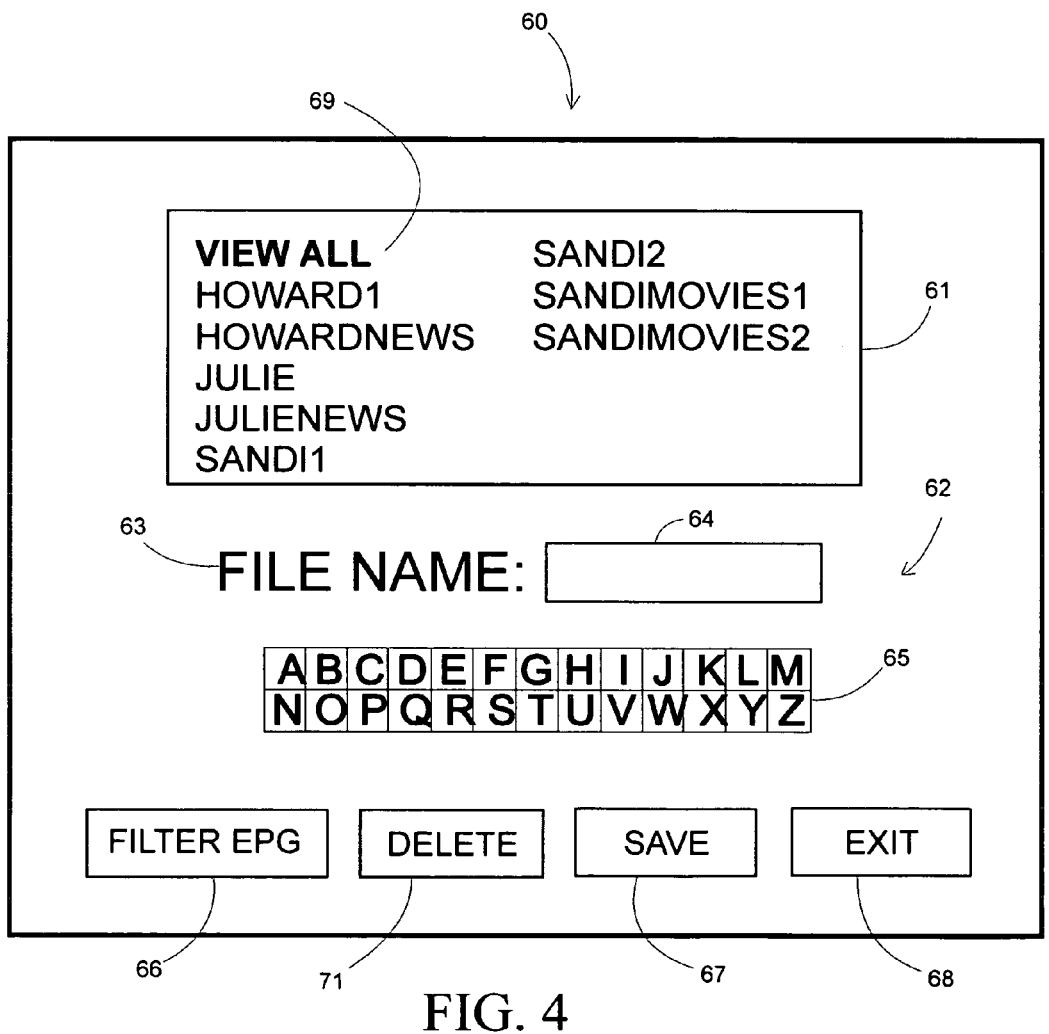
FIG. 4 is an exemplary illustration showing a save screen which provides for file manipulation of the various attributes which have been configured by the user.

In the event that the user actuates row 52 defining an exemplary EPG access point, a file screen 60 may be generated on the display as shown in FIG. 4. The file screen 60 generally comprises a file window 61, a file name entry field 62, a plurality of actuatable icons (66, 67, 68, and 71) for manipulation of the interactive search system by the user. A list of all stored user configurations 69 are displayed in the file window automatically upon generation of the file screen. In this manner, the user may easily identify attribute configurations (to be described hereinbelow) which have been saved from a previous session. Beneath the file window is a file name entry field 62 comprising a prompt 63, a file name entry box 64 and a plurality of actuatable alpha icons 65 corresponding to all the letters of the alphabet. Naming of a particular attribute configuration may be accomplished via successively pressing a plurality of alpha icons 65 in order to generate a filename, which is shown in the entry box 64. A save icon 67 is provided to request saving of the current attribute configuration within system non-volatile memory such as in mass storage 35 or the program and database storage 23 located in the head end. A delete icon 71 is provided which provides for deletion of any file shown in the file window; however, the "VIEW ALL" file is perenially persistent and may not be removed. It is important to note, however that the MSO operator may have authorization rights to delete, or modify the filtering attributes contained within the "VIEW ALL" filename. The "VIEW ALL" file exists to allow perusal of the unfiltered media content display system in its entirety. An exit icon 68 is also included that provides for exiting of the system from the interactive search system back to the EPG screen as shown in FIG. 3.

Figure 5:
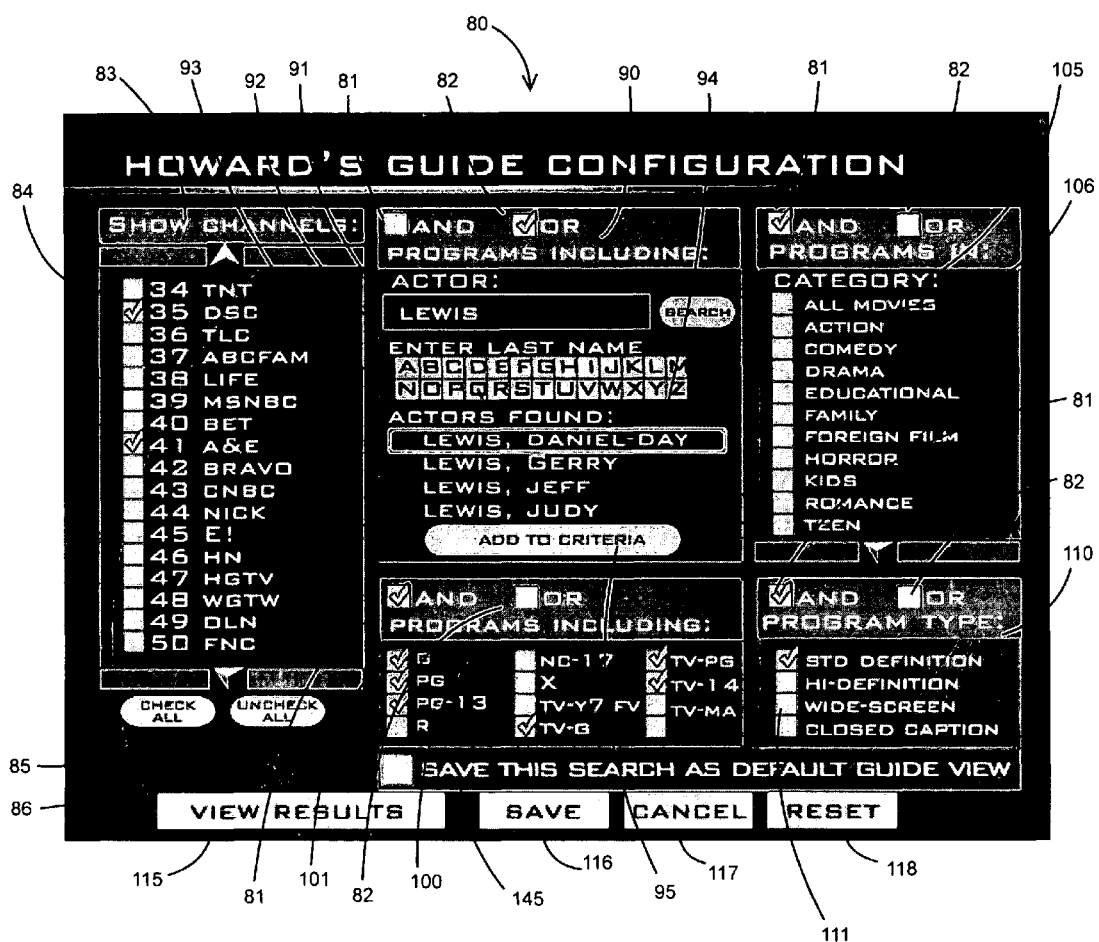
FIG. 5 is a screen view of an exemplary interactive configuration screen of the present invention.

If the "FILTER EPG" button 66 is pressed by the user, a configuration screen 80 may be generated on the display as shown in FIG. 5. The configuration screen 80 generally provides a means for user entry of multiple attributes that are used by the interactive search system. The user configurable attributes preferably utilize information that is commonly available within a program listings data or metadata file associated with each video program. Although it is well known by those skilled in the art that many differing types of attributes may be utilized in order to form the interactive search system, only several differing types of configurable attributes are shown in the exemplary present embodiment. The utility of the interactive search system is further enhanced through the use of optional boolean operators, which serve to more precisely tailor the search operation. The boolean operators may be included with any or all configurable attributes and are provided by "AND" 81, and "OR" 82 actuatable radio buttons disposed with each configurable attribute. If an "AND" radio button is selected over any configurable attribute, a matching video program must contain that attribute as well as the other specified attributes. If an "OR" button is selected over any configurable attribute, a matching video program may contain the instant attribute or may contain an attribute from either of the other configurable attributes. It is important to note that if the "FILTER EPG" button is actuated when no filename has been retrieved, the system may automatically clear (de-activate) all actuatable button and boxes of the configuration screen, thereby defining a default configuration. This is particularly true during initial usage wherein no previous filenames have been stored by the user.

One configurable attribute is a channels attribute which serves to instruct the interactive search system to only search through user specified channels for matching video programs. As shown in FIG. 5, a channels field 83 is included having a list of available channels corresponding to a plurality of programming sources, each having an actuatable programming source radio button 84 disposed therebeside. Upon pressing either programming source button in the list, the associated programming source is added to the list of channels which will be searched. Any quantity of buttons 84 that are selected by the user is cumulative, that is, the user may press multiple buttons 84 in order to search for video programs from a plurality of programming sources. Additionally, actuatable "CHECK ALL", and "UNCHECK ALL" buttons (85, and 86) are provided for automatically selecting or de-selecting all buttons 84 in the list respectively.

Another configurable attribute provided with the present embodiment is an actor (ress) attribute, wherein an actor field 90 is included for configurable entry of interesting actors. The actor field may include a prompt 91, entry box 92, a plurality of alpha entry buttons 93, and a name completion field 94. Entering of a particular actor's/actress's name may be accomplished via successively pressing a plurality of alpha buttons 93 in order to create an actor's (actress's) in the entry box 92. An additional feature of the actor field 90 is a name completion field 94, which serves to minimize the amount of entry required by the user. The name completion field displays a list of stored actor's (actress's) names in which the spelling thereof is substantially similar to the alpha characters listed in the entry box 92. An "ADD TO CRITERIA" button 95 is provided to automatically add the specified actor (actress) to the list upon successful entry of the actor's (actress's) name. As shown, the height of the entry box 92 is only sufficiently long to permit containment of one actor (actress) name therein, however the height of the box will be automatically lengthened by the system if a plurality of actors (actresses) are added as a configuration attribute.

Another configurable attribute provided with the present embodiment is a ratings field 100. The ratings field contains an exhaustive list of all possible ratings and an associated actuatable radio button 101 that any video program may have. Actuation of any particular radio button 101 causes the system to search for matching programs having that rating which is associated with that particular button. If the particular button has not been actuated by the user, video programs having that button will be processed by the system as a non-matched video program. The actuation of the plurality of ratings radio buttons are cumulative; that is, multiple ratings radio buttons may be actuated simultaneously in order for the system to retrieve matching video programs having differing ratings.

Another configurable attribute provided with the present invention is a category field 105. The category field may contain a list of categories or genres and corresponding category radio buttons 106 that a video program may be classified as. Actuation of any particular radio button 106 causes the system to search for matching programs classified within that particular category. If the particular button has not been actuated by the user, video programs in that classification will be processed by the system as a non-matched video program. The actuation of the plurality of category radio buttons are cumulative; that is, multiple category radio buttons may be actuated simultaneously in order for the system to retrieve matching video programs from differing categories.

Yet another configurable attribute provided with the present invention is program type field 110. The program type field contains a list of video program attributes, and associated actuatable program type radio buttons 111, which may describe some characteristic of the video program that is sought by the user. For example, the user may desire to search only for video programs that are available in high definition format, and is displayable in a wide format aspect ratio. In this instance, the user may limit the matching video programs to only high definition programs that is displayable in wide screen format by actuating the program type radio buttons associated with the appropriate attribute. The actuation of the plurality of program type radio buttons are cumulative; that is, multiple program type radio buttons may be actuated simultaneously in order for the system to retrieve matching video programs from differing formatting attributes.

Disposed beneath the attribute fields are several actuatable buttons comprising a "VIEW RESULTS" button 115, a "SAVE" button 116, a "CANCEL" button 117, and a "RESET" button 118. Actuation of the "SAVE" button causes the system to generate the file screen 60 as shown in FIG. 4, thereby allowing the user to save the currently existing attribute configuration under an existing file name or under a newly created file name. The "CANCEL" button causes the system to undo all immediate changes that were made to the attribute configuration. That is, all attributes within the configuration screen revert to the saved version of the attributes of the saved file that was retrieved in the file screen of FIG. 4. If no file name was entered prior to actuating the "FILTER EPG" button, and the "CANCEL" button is subsequently actuated, all fields and boxes of the configuration screen are cleared. Actuation of the "RESET" button causes the system to clear all attributes and boxes within the configuration screen.

Figure 6:
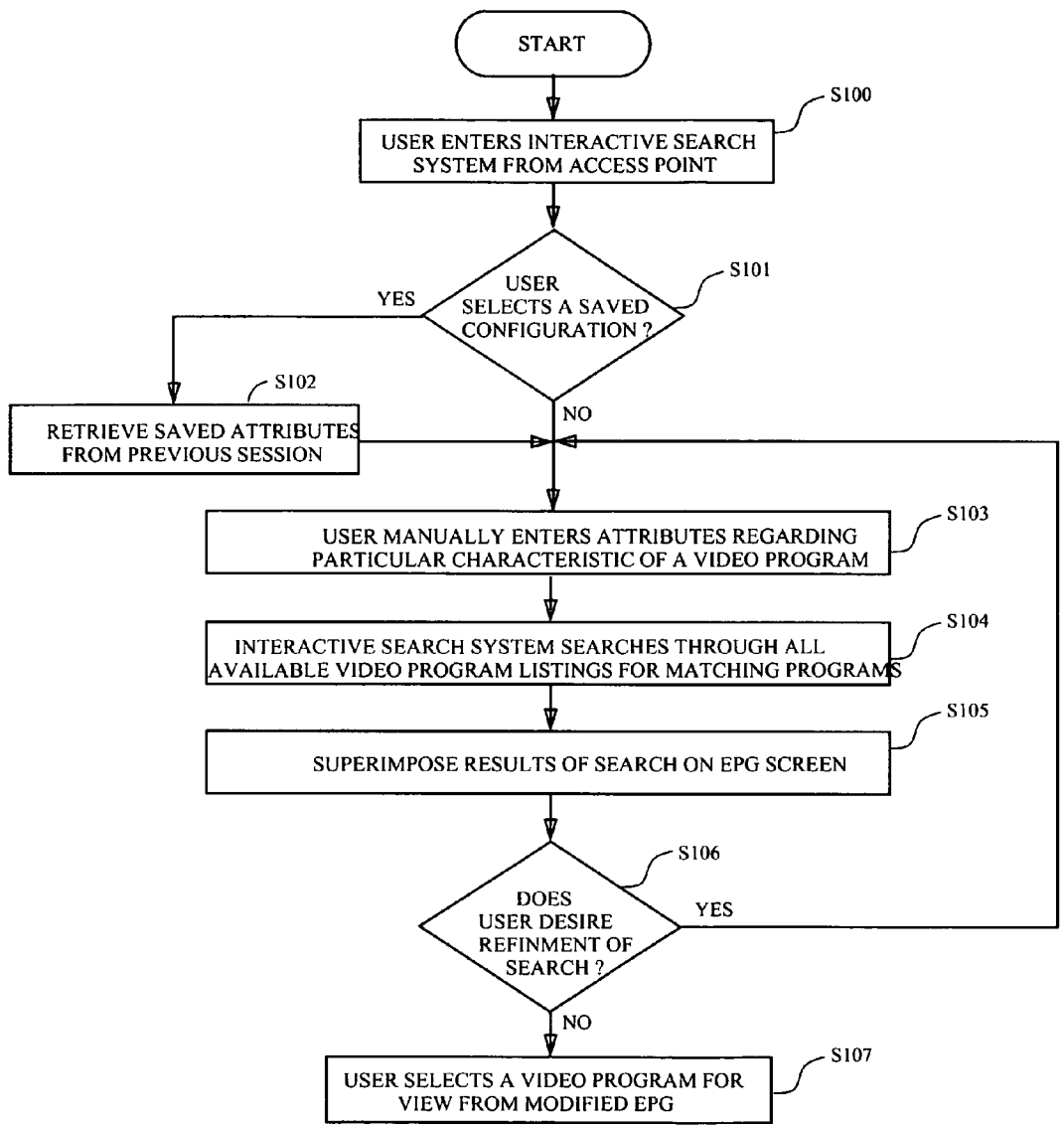
FIG. 6 is a flow diagram of a method for providing a manual search function according to the present invention.

In the event that the "VIEW RESULTS" button is actuated by the user, the system may be caused to categorize each of the video listings data corresponding to each of the video programs that is presented in the EPG. This categorization results in the creation of a sub-list of video program listings that is a subset of all video programs listings, wherein each video program listing in the sub-list is a matched video program. FIG. 6 shows a flow diagram of the operation of the interactive search system of the present invention. Initially, the user may enter the interactive search system from any aforedisclosed access point (step 100). Following entry into the search system, the user is given the opportunity to retrieve a saved attribute configuration either for usage or for further modification thereof (step 101). If the user desires to load a previously stored configuration, the system loads the configuration attributes that were saved during a previous session (step 102). However, if no previously stored file was retrieved by the user, the system is loaded with default attribute values for all of the configurable attributes. In either case, the user is allowed to modify the existing attribute values for all configurable attributes (step 103). When the user is satisfied with all attribute settings withing the configuration screen, a search is initiated that causes the system to read all attribute values from all video program listings in the EPG as well as stored video programs in order to create a sub-list of matched video programs (step 104). Immediately following creation of the sub-list, the system displays the results of the search conducted in step 104 for view by the user (step 105).

One particular enhancement provided by the system of the present invention is the ability to iterate through multiple system searches (as is step 104) in order to fully tailor the results provided to the user. In many cases, the initial search that was conducted may yield results that does not successfully match all of the available video programs that the user may have desired. The present invention provides a solution to this problem by allowing the user to re-modify the manually entered search criteria in order to perform a recursive search of the available video programs. Thus, following view of the search results, the user is given the option to re-modify search results if desired (step 106). However, if the user is satisfied with the given search results, the user may perform a perusal thereof in order to find an interesting program to watch (step 107).

It is important to note that at any time during the aforedescribed sequence, the user may save the current attribute configuration for use at a later time. Additionally, the user may save several differing attribute configurations in order to suit the varying tastes of the user. For example, on the weekend, the user may be interested in all video program offerings related to collegiate sports. During the week however, the user may be more interested documentary or informational type video programming. The present invention provides a solution to this need by allowing multiple attribute configuration settings to be saved for usage thereof at a later time.

Figure 7:
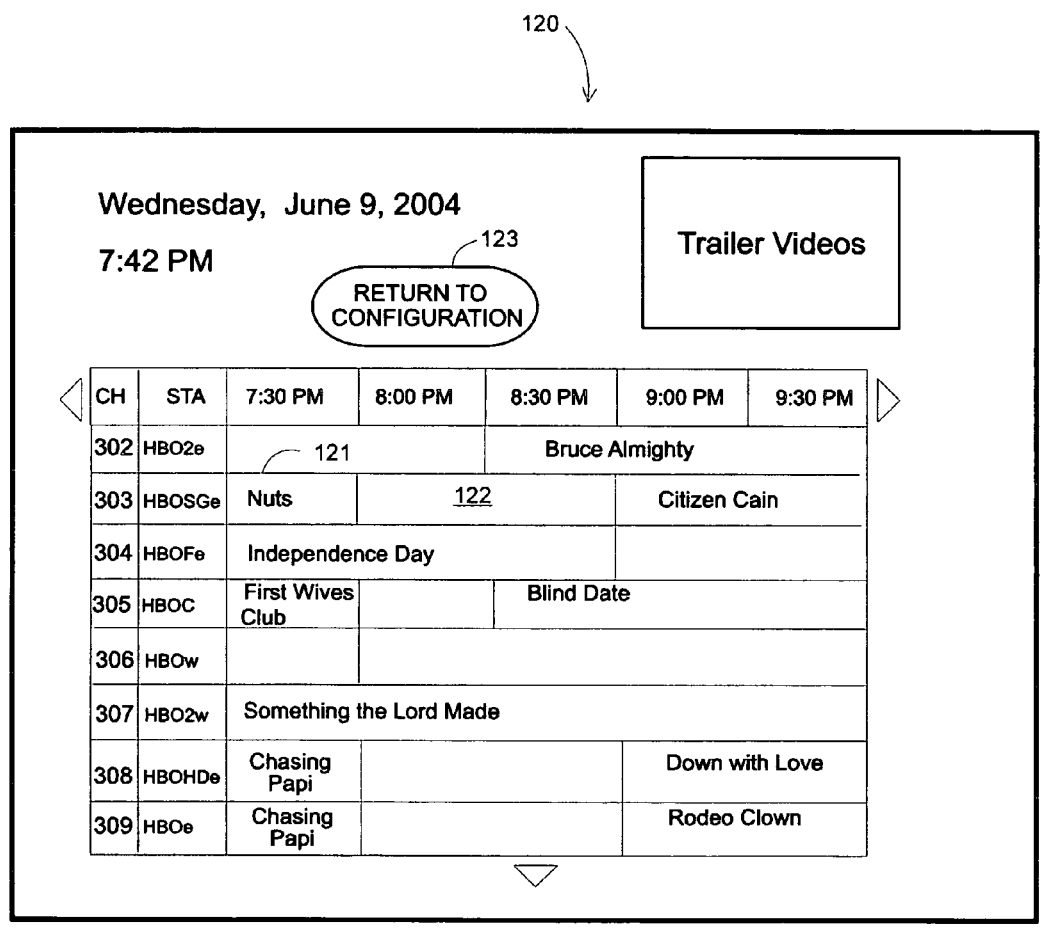
FIG. 7 is an exemplary illustration of a resulting EPG screen wherein non-matched visual indications of associated video program listings have been removed from view.

FIG. 7 shows an exemplary modified EPG screen 120, wherein all of the video program listings comprising the sub-list of matched video programs are shown in their normal contrast, and non-matched video program listings have been removed from the EPG screen. Thus, the user is allowed to quickly peruse through all matching video program listings in order to find an interesting program to watch in an ergonomically easy manner. As an example, the video program "Nuts" 121 which airs at 7:30 PM on HBOSGe was a matched program; therefore, the program title is shown in its normal contrast. However, the video program 122 on HBOSGe directly following the program "Nuts" was unmatched, therefore the cell has been cleared by the system. An actuatable "RETURN TO CONFIGURATION" button 123 is provided if the user desires to re-modify any of the configuration attributes or to save the presently existing configuration attributes for use at a later time.

Figure 8:
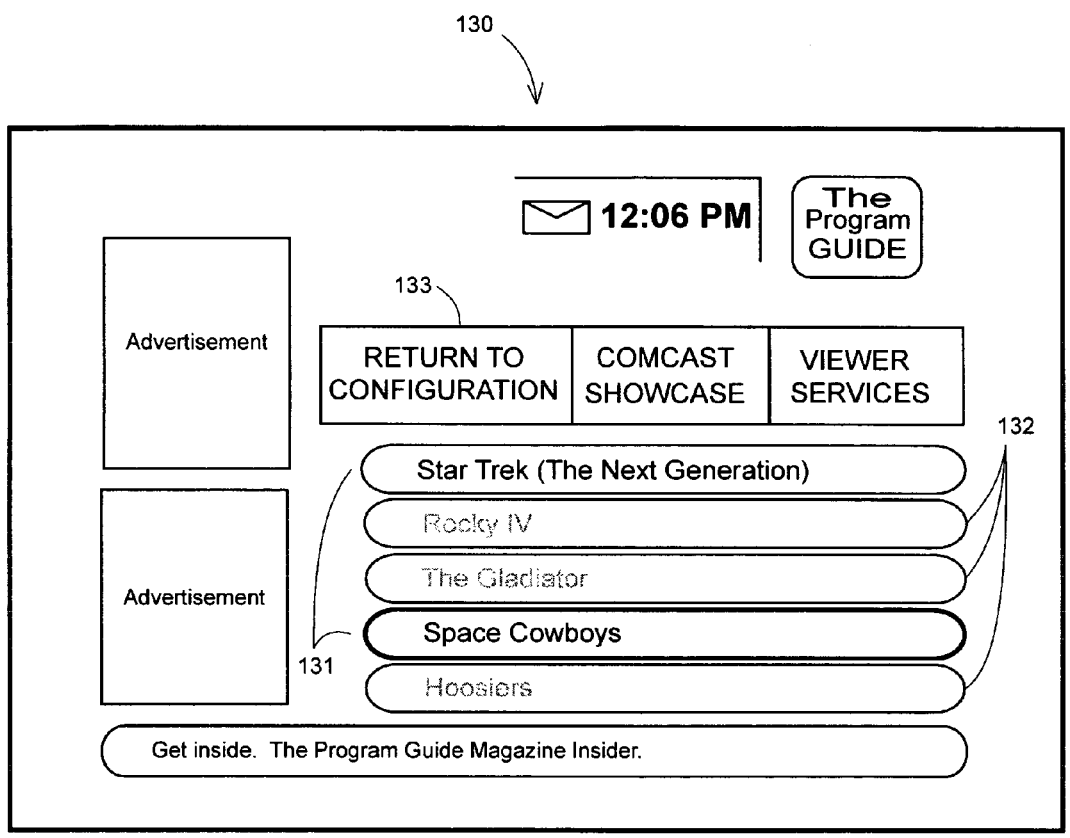
FIG. 8 is an exemplary illustration of a resulting VOD screen wherein non-matched visual indications of associated video program listings have a diminished brightness.

As an alternative means of displaying search results to the user, FIG. 8 shows a video on demand (VOD) screen 130 which may be accessed from the modified EPG screen of FIG. 7. In this exemplary view, matched video program listings 131 are shown in their respective normal contrast, and non-matched video program listings 132 are "grayed out" or have a diminished brightness in order to indicate non-matching content to the user. Although the present embodiment provides means of visually differentiating matched versus non-matched video program listings wherein the visual indications thereof have differences in brightness, it is to be understood that virtually any visually differentiating scheme that provides sufficient contrast for the user may be employed such as differing colors, differing color hues, differing surface patterns, and the like. An actuatable "RETURN TO CONFIGURATION" button 133 is provided for returning to the configuration screen for re-modification thereof or for saving of present attribute configuration for use at a later time. Thus, the VOD screen shows an exemplary means of providing positively selected media content in the form of VOD content on a screen; nevertheless, it is to be appreciated that other forms of media content such as Internet media content, P2P media content, PVR media content, and the like may also be displayed on other screens (not shown) in a similar manner.

In addition to providing a media content search system that is manually accessible by the user, the system may also provide for automated filtering of media content listings which are periodically forwarded to the user premises equipment. The resulting EPG or VOD screen that is accessed in the conventional manner may be displayed with media content listings that have already been filtered by the system, thus abating the need to perform a new search operation each time the system is accessed. This automated access point provides advantage in that the user may quickly view search results without requirement of a multiple key-stroke sequence in order to retrieve useful filtered information. An additional perk provided by the automated filtering access point is that there is no effective time delay for a response from a user request due to the fact that the filtered media content data is continually being updated in the system. It is important to note that the automated access point as described hereinbelow, may be implemented in conjunction with the aforedescribed manual search system, or may be implemented in lieu thereof.

Figure 9:
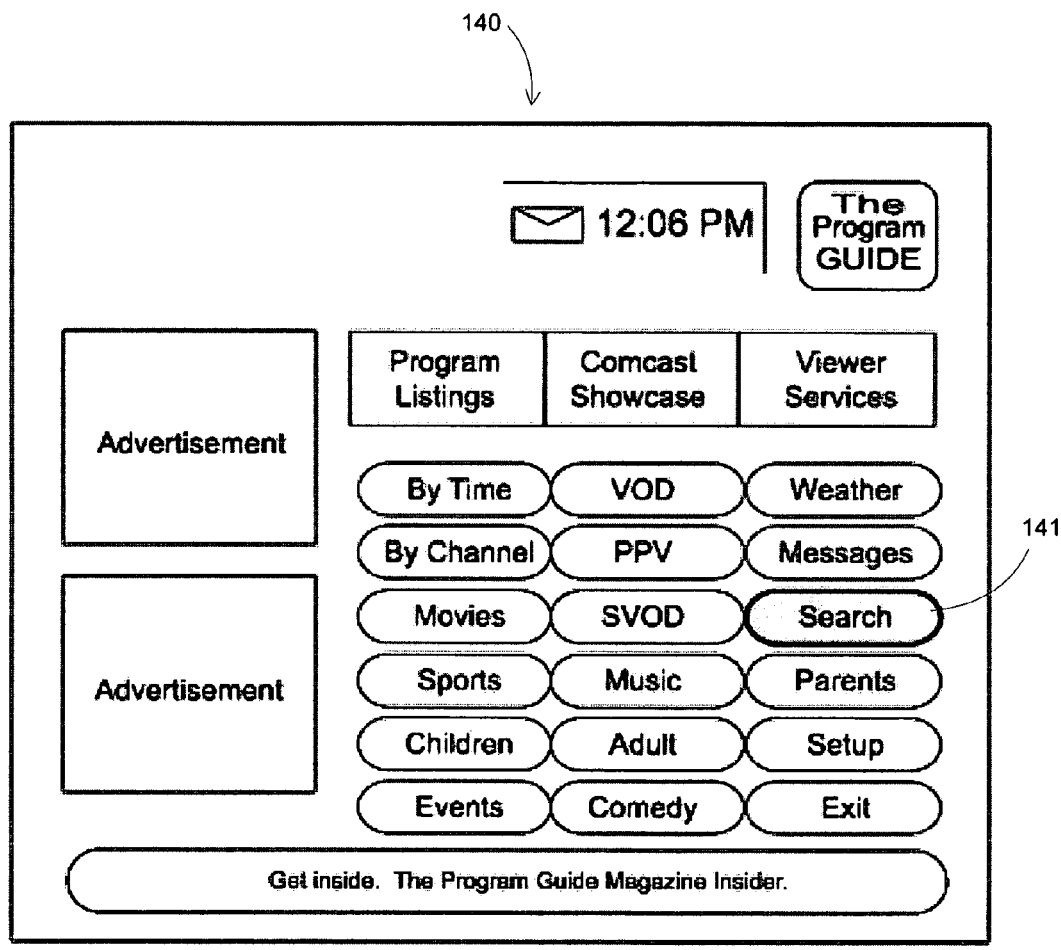
FIG. 9 is an exemplary illustration of a main menu screen according to the present invention.

Access of media content listings in a media content listings system such as an EPG that has been automatically filtered by the automated filtering system is provided in the conventional manner. An EPG screen having filtered media content which has been automatically filtered may be accessed in a manner typical with conventional EPG access techniques. For example, the filtered EPG screen may be accessed using a dedicated button on the remote control device 17 or through a main menu screen 140 as shown in FIG. 9, wherein the depicted main menu screen is a generic exemplary view of a screen that is commonly accessible by most CATV networks. As shown in the main menu screen, a "SEARCH" button 141 is provided that, when pressed, causes the system to generate the filtered EPG screen on the display. Upon actuation of the "SEARCH" button 141, a screen may be displayed that is effectively similar to the EPG screen as shown in FIG. 7, wherein positively selected media content may be represented by representative delineated indicia that is different from non-positively selected media content. Access to other media content such as VOD, Internet media content, P2P media content, PVR media content, and the like may likewise be displayed in a screen(s) in a similar manner to FIG. 8.

Access to the configuration of the automated filtering system of the present invention may be provided by the manual access points as described hereinabove. Access of a manual access point causes the system to generate the file screen as shown in FIG. 4. Any existing configuration file may be adapted for use with the automated filtering system. A "SAVE THIS SEARCH AS DEFAULT GUIDE VIEW" prompt and associated radio button 145 is provided in the configuration screen 80 which allows any configuration to be saved by the system as the automated filtering of the media content listings.

Figure 10:
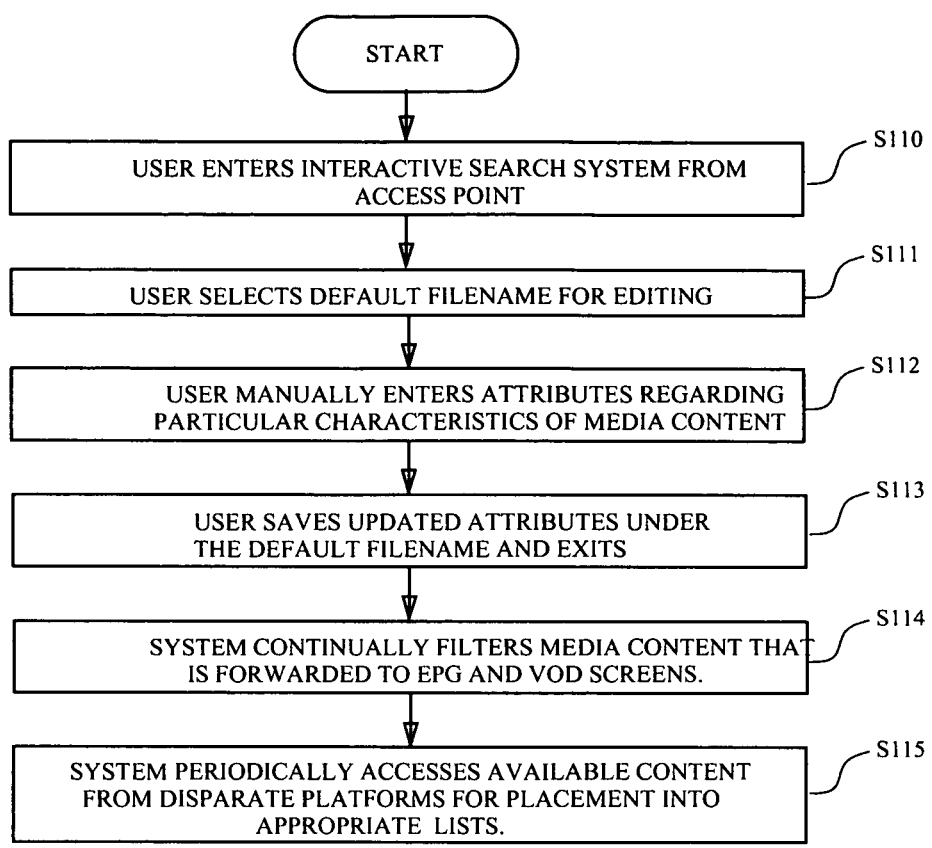
FIG. 10 is a flow diagram of a method for providing an automated filtering system according to the present invention.

FIG. 10 shows an exemplary flow diagram of the method of operation of the automated filtering system of the present invention. In step S110, the user accesses the configuration of the associated attributes from any aforedescribed access points. In response, the system generates a file screen as shown in FIG. 4. At this point, the user may then select any existing configuration file via highlighting the desired filename in the file window followed by actuation of the 'FILTER EPG' button 66 (step S111). In response, the system generates the configuration screen 80 as shown in FIG. 5. The user may make appropriate changes to the shown attributes (step S112). The user may then save the current configuration settings for use with the automated filtering system by actuating the radio button 145 (step S113). In response, the system may store the current configuration settings in either the program and database storage 23 or optional mass storage 23. The system remains continually resident on the system and filters all incoming media content that is directed to either the EPG or VOD screens (step 114). Additionally, periodic search functions, which are commonly termed 'cron jobs' are periodically executed in order to retrieve pertinent media content to other associated lists that are used by the system.

The present invention may be embodied in other specific forms without departing from the spirit or scope of the invention. For example, an alternative embodiment of the present invention contemplates an interactive search system which is modifiable or accessible from consumer electronic display devices that are interconnected to disparate networks such as the Internet or the PSTN. One such example is a conventional personal computer, PDA, or laptop computer, which is interconnected to the Internet. With this type of interactive device, screens that are substantially similar to FIGS. 4, 5, 7, and 8 may be implemented for modification or access of the interactive search system. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of providing an interactive media content display system comprising:
    accessing, by a head end, a program database identifying a plurality of content items, the program database including attributes associated with each of the plurality of content items, the attributes including information relating to programming associated with each of the plurality of content items including one or more of title, actors, ratings, and genres, the attributes also including information relating to formatting associated with each of the plurality of content items including one or more of program type, display format, and closed caption availability;
    providing, from the head end to a set top box via a Hybrid-Fiber-Cable distribution network, a configuration interface having a plurality of configurable categories of criteria to filter the plurality of content items, the criteria including selectable keywords, channels, genres, ratings, actor names, and display format;
    receiving, at the head end from the set top box, criteria to identify relevant content items;
    when the criteria to identify the relevant content items include alpha characters associated with an actor name entry in the configuration interface, providing a list of actor names, wherein each actor name in the list of actor names includes the alpha characters associated with the actor name entry, and wherein each actor name in the list of actor names is selectable by the user for use as a attribute of the criteria to identify the relevant content items;
    determining, at the head end, the relevant content items of the plurality of content items satisfying the criteria;
    transmitting, from the head end to the set top box, a programming guide including the listing of the plurality of content items that are selectable to view a particular content item, wherein each of the plurality of content items satisfying the criteria are visually distinguishable from each of the plurality of content items not satisfying the criteria; and
    receiving, at the head end from the set top box, a selection to save a user configuration including the criteria;
    saving the user configuration including the criteria at the head end, the user configuration being identifiable by a filename, wherein subsequent input of criteria that identifies the filename causes the interactive media content display system to display a programming guide including the relevant content items of the plurality of content items satisfying the criteria.

2. The method of providing the interactive media content display system of claim 1, further comprising saving the criteria.

3. The method of providing the interactive media content display system of claim 1, wherein the criteria includes a keyword, a channels, a genres, a rating and a display format.

4. The method of providing the interactive media content display system of claim 3, wherein the criteria is logically combined using AND/OR Boolean operators.

5. The method of providing the interactive media content display system of claim 4, wherein a keyword is selected by receiving a term.

6. The method of providing the interactive media content display system of claim 1, wherein the criteria are configurable using a user input device.

7. The method of providing the interactive media content display system of claim 6, wherein the user input device is a remote control device.

8. The method of providing the interactive media content display system of claim 1, wherein the programming guide is an electronic program guide.

9. The method of providing the interactive media content display system of claim 1, wherein the programming guide is a video on demand (VOD) screen.

10. A computer-implemented method for providing the improved display of user-specified program listings to be displayed in an interactive content display system, the method comprising:

by a head end of a Hybrid-Fiber-Cable (HFC) distribution network:
receiving a plurality of program listings;
receiving a plurality of actor names;
populating the plurality of program listings into an electronic program guide (EPG) comprising a plurality of cells organized into a plurality of rows, each row of the plurality of rows including a plurality of columns, wherein one row is an access row that is allocated for providing access to an interactive search system when selected by a user, wherein each of the plurality of cells not in the access row are populated with one program listing of the plurality of program listings and are selectable by the user to view a content item associated with the program listing populated into the cell;
transmitting the EPG to a set top box (STB) associated with the user via the HFC distribution network;
in response to receiving a selection of the access row from the STB, providing the STB with an interface having a plurality of configurable categories of criteria to filter the EPG, the criteria being selectable via actuable buttons in the interface, the plurality of configurable categories of criteria including an actor field operable to enable the user to input alpha characters via the actuable buttons to select an actor name as a criterion, wherein the actor field is associated with a name completion field operable to reduce an amount of entry in the actor field by providing a list of actor names from the plurality of actor names, wherein each actor name in the list of actor names includes the alpha characters entered in the actor field and wherein each actor name in the list of actor names is selectable by the user for use as the criterion;
in response to receiving a selection of the criterion from the STB, configuring the EPG to visually distinguish the cells that are populated with program listings that satisfy the criterion from the cells that are populated with program listings that do not satisfy the criterion;
transmitting the configured EPG to the STB via the HFC distribution network;
receiving, from the STB, a selection to save a user configuration including the criteria; and
saving, at the head end of the HFC distribution network, the user configuration including the criteria, the user configuration being identifiable by a filename, wherein subsequent input of criteria that identifies the filename causes the interactive media content display system to display a programming guide including the relevant content items of the plurality of content items satisfying the criteria.

11. The computer-implemented method of claim 10, wherein the configured EPG is saved on the STB local to the user for later access by the user.

12. The computer-implemented method of claim 10, wherein the selection of the criterion is received at the head-end as a control signal from a set top box local to the user, and the EPG is configured by the head-end and transmitted to the set top box.

13. The computer-implemented method of claim 10, wherein the plurality of configurable categories of criteria further include: keywords, channels, genres, ratings, and display format.

14. The computer-implemented method of claim 13, wherein the plurality of configurable categories of criteria include Boolean operators to logically combine multiple selected criteria via AND operators and OR operators.

15. The computer-implemented method of claim 10, further comprising:
in response to receiving a subsequent selection of the access row, providing the user with the EPG configured according to the selection of the criterion.

16. The computer-implemented method of claim 10, further comprising:
in response to receiving a subsequent selection of the access row, prompting the user to select a new criterion from the plurality of configurable categories of criteria.

17. A system for providing the improved display of user-specified program listings to be displayed in an interactive content display, the system comprising:

a processor; and
a database storage device, including instructions for programs that when executed by the processor enable the system to:
obtain scheduled video program listings from a listings server that include attribute values for video programs included in the scheduled video program listings;
populate an EPG (Electronic Programming Guide) with the video programs based on the scheduled video program listings;
provide the EPG to an STB (set top box), wherein the STB is located distally from the system;
receive a user-configured selection of attributes from the STB, wherein the user-configured selection of attributes selected from a group consisting of:
an actor name;
a program title;
a program rating;
a program genre; and
a program type;
in response to receiving a command from the STB, save the user-configured selection of attributes in the database in association with an identifiable filename, wherein subsequent input of criteria that identifies the filename causes the system to re-select the user-configured selection of attributes;
identify video programs in the EPG associated with attributes satisfying the user-configured selection of attributes;
filter the EPG to display the video programs identified as having the attributes satisfying the user-configured selection of attributes; and
transmit the filtered EPG to the STB;
wherein the system is hosted at a head end of a Cable Television Distribution System, wherein the head end provides a plurality of households with the video programs over an HFC (Hybrid-Fiber-Cable) distribution network received from a plurality of programming sources, wherein each programming source of the plurality of programming sources hosts an associated listings server in communication with the system; and
wherein the EPG comprises a plurality of cells displaying the program listings, wherein the plurality of cells are organized into a plurality of rows and a plurality of columns, each row of the plurality of rows being associated with a channel for the program listings and each column of the plurality of columns being associated with a time for the program listings, wherein when a given column does not contain at least one cell displaying the program listings that satisfy the criteria the given column is removed from the EPG.

* * * * *